B. DELONG.
Seeding-Machine
No. 216,025. Patented June 3, 1879.
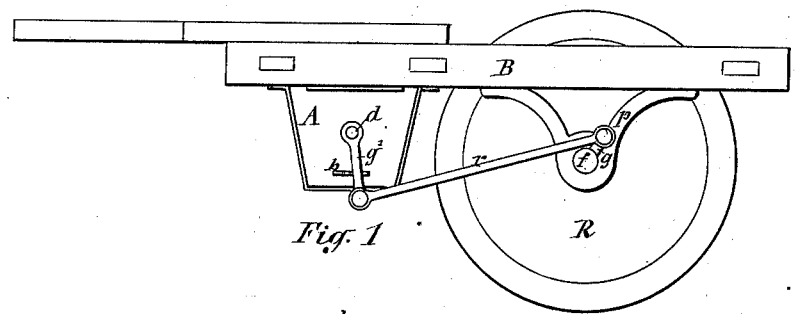
Fig. 1
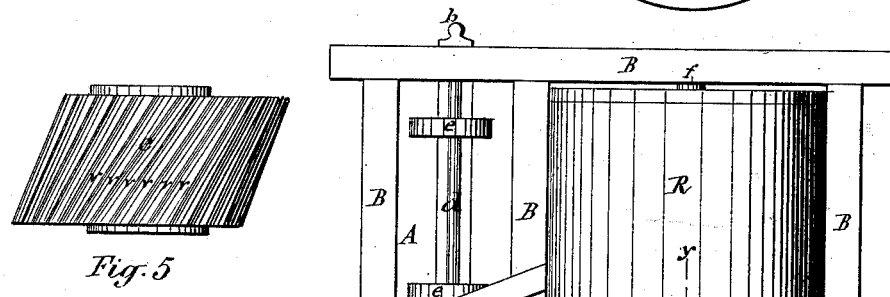
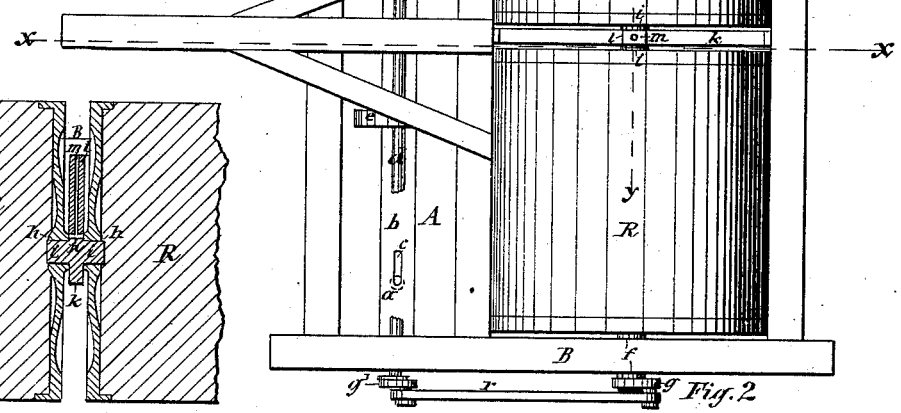
Fig. 5
Fig. 4
Fig. 2
Fig. 3
WITNESSES:
C. Bendixen
A. Wood
INVENTOR:
Benjamin Delong
per E. Laass, his Atty.

UNITED STATES PATENT OFFICE.

BENJAMIN DELONG, OF CAUGHDENOY, NEW YORK.

IMPROVEMENT IN SEEDING-MACHINES.

Specification forming part of Letters Patent No. 216,025, dated June 3, 1879; application filed March 18, 1879.

*To all whom it may concern:*

Be it known that I, BENJAMIN DELONG, of Caughdenoy, in the county of Oswego, in the State of New York, have invented new and useful Improvements in Seeding-Machines, of which the following, taken in connection with the accompanying drawings, is a full, clear, and exact description.

The invention consists, essentially, in the combination, with a seed box or hopper provided with a series of discharge-openings, of a rock-shaft arranged longitudinally through the seed-box, and provided at each discharge-opening with a separate oscillating segmental sweep having in its peripheral face oblique parallel grooves of uniform widths, whereby the seed is conveyed in a uniform stream to the discharge-openings from both sides thereof, and maintained uniformly distributed in the seed-box, and the danger of becoming clogged is effectually obviated, all as hereinafter more fully described.

In the accompanying drawings, Figure 1 is a side elevation of my invention; Fig. 2, a plan view of same; Fig. 3, a longitudinal vertical section taken on line $xx$ in Fig. 2; Fig. 4, a transverse vertical section on line $yy$ in Fig. 2; and Fig. 5, an enlarged detail view of the device for feeding the discharge of the seeding apparatus.

Similar letters of reference indicate corresponding parts.

A represents an elongated seed box or hopper extended across the forward end of a frame, B, and pendent thereon. The interior of the said seed-box is made with a semicircular or segmental bottom, and along the center or lowest part thereof it is provided with a series of apertures, $a\ a$, equidistant apart. Over the said apertures is arranged to slide longitudinally a plate, $b$, having a longitudinal slot, $c$, at each of the apertures $a$, so that by the sliding of said plate the openings in the bottom of the seed-box may be closed or opened to any required extent, and thus the egress of seed regulated. Centrally over the apertures in the bottom of the seed-box A is a rock-shaft, $d$, extended longitudinally through said seed-box, and upon this rock-shaft $d$ are mounted a series of segmental sweeps, $e$, arranged over the openings $a$, and having their periphery in close proximity to the slide $b$. The peripheral face of the said sweeps is provided with oblique transverse grooves or channels $v$, as best seen in Fig. 5 of the drawings, which channels are of a uniform width throughout their length, and arranged parallel to each other.

The sweeps $e$ receive an oscillating or reciprocal rotary movement from the rock-shaft $d$, which movement conveys the seed to the discharge-opening $a$ alternately from opposite sides thereof, the flow of the seed being rendered uniform by the uniformity of the dimensions and the parallel arrangement of the grooves $v$. All lumps of dirt or other foreign substances which may enter the grooves of the sweeps and have a tendency to clog the feed are either crushed by the shearing action of the interjacent ribs of the grooved face of the sweep with the edge of the discharge-opening, or ejected by the reciprocal movement of the sweeps. The seed is maintained uniformly distributed throughout the length of the seed-box by the interposition of the sweep $e$, which prevents the thrust of the seed from end to end of said seed-box incident to the movement of the machine over uneven ground.

Back of the seed-box A, and connected with the same frame B, are two land-rollers, R, which serve to crush the lumps of the soil and cover the seed, and at the same time furnish the power for actuating the feed mechanism in the seed-box A. The said rollers have at their respective outer ends a trunnion, $f$, journaled in a pedestal, $p$, attached to the under side of the frame B. The trunnion of one of the rollers is extended through the pedestal, and is provided at the outside thereof with a crank, $g$, which by the medium of a rod, $r$, is connected with a crank, $g'$, on the end of the rock-shaft $d$, protruding through the end of the seed-box. The crank of the roller is made of a shorter stroke than that of the crank-shaft, so as to impart to the latter the requisite reciprocal rotary motion. The inner end of the respective rollers is provided with a socket, $h$, in which is fitted a gudgeon, $i$, projecting from opposite sides of a brace, $k$, which is arranged between the rollers and extended across the frame B, and rigidly attached thereto.

To strengthen the said brace, and at the same time provide a simple, comparatively inexpensive, and effective means for lubricating the gudgeons $i\ i$, I construct the said brace in the form of a truss, having a center-post, $l$, and braces $k'\ k'$ extended from near the top thereof toward the ends of the braces $k\ k$, the whole of which is cast in one piece and with a channel, $m$, extending the length of the post $l$, and intersecting a lateral channel, $n$, at the top of the gudgeons. The lubricant is introduced in the channel $m$ at the upper extremity of the limb $l$, which is of proper height to render it convenient of access for that purpose. The transverse channels $n$ distribute the lubricant to the bearings of the gudgeons $i\ i$.

Having described my invention, what I claim is—

In combination with a seed box or hopper provided with a series of discharge-openings, a rock-shaft arranged longitudinally through the seed-box, and provided at each discharge-opening with a segmental sweep, $e$, having in its peripheral face oblique parallel grooves of uniform width, constructed and operating substantially in the manner herein described.

In testimony whereof I have hereunto set my hand this 3d day of March, 1879.

BENJAMIN DELONG.

Witnesses:
J. I. VAN DOREN,
A. WOOD.